United States Patent
Zhu et al.

(10) Patent No.: US 10,637,554 B2
(45) Date of Patent: *Apr. 28, 2020

(54) WIRELESS COMMUNICATION METHOD AND WIRELESS COMMUNICATION DEVICE

(71) Applicant: Sony Corporation, Tokyo (JP)

(72) Inventors: Xudong Zhu, Beijing (CN); Zhaocheng Wang, Beijing (CN); Jinhui Chen, Beijing (CN)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/596,779

(22) Filed: Oct. 9, 2019

(65) Prior Publication Data

US 2020/0044719 A1 Feb. 6, 2020

Related U.S. Application Data

(63) Continuation of application No. 15/769,510, filed as application No. PCT/CN2016/092029 on Jul. 28, 2016, now Pat. No. 10,491,288.

(30) Foreign Application Priority Data

Nov. 5, 2015 (CN) .......................... 2015 1 0746842

(51) Int. Cl.
  *H04B 7/06* (2006.01)
  *H04B 7/0456* (2017.01)

(52) U.S. Cl.
  CPC ......... *H04B 7/0691* (2013.01); *H04B 7/0456* (2013.01); *H04B 7/0617* (2013.01);
  (Continued)

(58) Field of Classification Search
  CPC .. H04B 7/0456; H04B 7/0617; H04B 7/0626; H04B 7/0632; H04B 7/0639; H04B 7/0691–0695
  See application file for complete search history.

(56) References Cited

U.S. PATENT DOCUMENTS 4,188,578 A * 2/1980 Reudink ............. H04B 7/2046
                                                     370/323
4,318,104 A * 3/1982 Enein ....................... H01Q 3/40
                                                     342/372

(Continued)

FOREIGN PATENT DOCUMENTS

CN     101867402 A     10/2010
CN     102571290 A      7/2012

(Continued)

OTHER PUBLICATIONS

International Search Report dated Oct. 31, 2016 in PCT/CN2016/092029 filed Jul. 28, 2016.

*Primary Examiner* — James M Perez
(74) *Attorney, Agent, or Firm* — Xsensus LLP

(57) ABSTRACT

A wireless communication method and a wireless communication device. The wireless communication device includes: one or more processors, configured to generate multiple data flows, the multiple data flows being transmitted to one or more receivers through the first quantity of radio frequency links; and to configure an antenna control parameter, the antenna control parameter being used for dynamically allocating the second quantity of antennas to the first quantity of radio frequency links. The one or more processors configure the antenna control parameter for transmission to be performed, and any one of the second quantity of antennas can be allocated to any one of the first quantity of radio frequency links in a configurable manner.

7 Claims, 6 Drawing Sheets

(52) U.S. Cl.
CPC ......... *H04B 7/0626* (2013.01); *H04B 7/0695* (2013.01); *H04B 7/0632* (2013.01); *H04B 7/0639* (2013.01)

(56) References Cited

U.S. PATENT DOCUMENTS

| | | | | |
|---|---|---|---|---|
| 4,686,533 A * | 8/1987 | MacDonald | H01Q 3/26 | 342/371 |
| 4,731,614 A * | 3/1988 | Crane | H01Q 3/42 | 342/372 |
| 5,353,032 A * | 10/1994 | Bertocchi | G01S 1/48 | 342/372 |
| 5,434,575 A * | 7/1995 | Jelinek | H01Q 21/062 | 342/365 |
| 5,952,964 A * | 9/1999 | Chan | H01Q 3/22 | 342/368 |
| 6,005,515 A * | 12/1999 | Allen | H01Q 3/40 | 342/368 |
| 6,133,868 A * | 10/2000 | Butler | H01Q 3/267 | 342/165 |
| 6,175,326 B1 * | 1/2001 | Kare | H01Q 3/26 | 342/25 R |
| 6,181,276 B1 * | 1/2001 | Schlekewey | H04W 16/28 | 342/372 |
| 6,295,026 B1 * | 9/2001 | Chen | H01Q 1/288 | 342/368 |
| 6,498,545 B1 * | 12/2002 | Levi | H01Q 3/34 | 333/156 |
| 6,522,897 B1 * | 2/2003 | Martek | H01Q 1/246 | 455/561 |
| 6,559,798 B1 * | 5/2003 | Marumoto | H01Q 3/2605 | 342/372 |
| 7,539,458 B2 * | 5/2009 | Jafarkhani | H04B 7/0617 | 342/368 |
| 7,680,461 B2 * | 3/2010 | Takano | H04B 7/0615 | 370/328 |
| 8,000,401 B2 * | 8/2011 | Lee | H04B 7/0456 | 370/203 |
| 8,026,863 B2 * | 9/2011 | Young | H01Q 21/0025 | 342/373 |
| 8,457,026 B1 * | 6/2013 | Ho | H04B 7/0617 | 342/359 |
| 8,649,418 B1 * | 2/2014 | Negus | H04B 7/0486 | 375/211 |
| 8,767,860 B2 * | 7/2014 | Catreux | H04B 7/0615 | 375/260 |
| 9,130,706 B2 * | 9/2015 | Grant | H04B 7/061 | |
| 9,445,282 B2 * | 9/2016 | Chen | H04B 7/0695 | |
| 9,479,240 B1 * | 10/2016 | Caire | H04B 7/024 | |
| 9,847,802 B1 * | 12/2017 | Farley | H04B 1/16 | |
| 9,906,285 B2 * | 2/2018 | Ling | H04B 7/0617 | |
| 10,098,018 B2 * | 10/2018 | Lysejko | F16M 11/06 | |
| 10,116,061 B2 * | 10/2018 | Artemenko | H01Q 3/245 | |
| 10,170,833 B1 * | 1/2019 | Hollenbeck | H01Q 3/26 | |
| 10,218,550 B1 * | 2/2019 | Kim | H04L 27/2334 | |
| 10,355,740 B2 * | 7/2019 | Yamaguchi | H01Q 21/0025 | |
| 10,491,288 B2 * | 11/2019 | Zhu | H04B 7/0456 | |
| 2002/0054580 A1 * | 5/2002 | Strich | H04W 16/06 | 370/334 |
| 2003/0048226 A1 * | 3/2003 | Gothard | H01Q 1/38 | 343/700 MS |
| 2003/0107517 A1 * | 6/2003 | Ikeda | H04B 7/084 | 342/372 |
| 2005/0012665 A1 * | 1/2005 | Runyon | H01Q 1/246 | 342/372 |
| 2006/0068739 A1 * | 3/2006 | Maeda | H04B 1/30 | 455/295 |
| 2006/0237830 A1 * | 10/2006 | Danno | H01L 21/561 | 257/678 |
| 2007/0093274 A1 * | 4/2007 | Jafarkhani | H04B 7/0617 | 455/562.1 |
| 2007/0140102 A1 * | 6/2007 | Oh | H04B 7/061 | 370/208 |
| 2007/0165736 A1 * | 7/2007 | Wang | H04B 7/0695 | 375/267 |
| 2007/0205943 A1 * | 9/2007 | Nassiri-Toussi | H04B 7/0617 | 342/377 |
| 2008/0056402 A1 * | 3/2008 | Jang | H04B 7/061 | 375/267 |
| 2008/0240031 A1 * | 10/2008 | Nassiri-Toussi | H04B 7/0408 | 370/329 |
| 2008/0247364 A1 * | 10/2008 | Kim | H04B 7/0671 | 370/336 |
| 2009/0232244 A1 * | 9/2009 | Kawasaki | H04B 7/06 | 375/267 |
| 2009/0316807 A1 * | 12/2009 | Kim | H04B 7/061 | 375/260 |
| 2010/0054356 A1 * | 3/2010 | Keerthi | H04B 7/0617 | 375/267 |
| 2010/0091745 A1 * | 4/2010 | Bevan | H04W 24/02 | 370/338 |
| 2011/0102263 A1 * | 5/2011 | Angeletti | H01Q 3/40 | 342/373 |
| 2012/0045999 A1 * | 2/2012 | Ono | H01Q 3/36 | 455/67.16 |
| 2012/0236955 A1 * | 9/2012 | Zhou | H04B 7/061 | 375/267 |
| 2012/0287887 A1 * | 11/2012 | Jung | H04B 7/0413 | 370/329 |
| 2013/0051496 A1 * | 2/2013 | Li | H04B 1/28 | 375/334 |
| 2013/0121342 A1 * | 5/2013 | Kim | H04B 7/0691 | 370/436 |
| 2013/0202054 A1 * | 8/2013 | Khan | H01Q 3/26 | 375/259 |
| 2013/0222183 A1 * | 8/2013 | Lin | H01Q 3/42 | 342/372 |
| 2014/0036765 A1 * | 2/2014 | Fujimura | H04B 7/18515 | 370/317 |
| 2014/0241446 A1 * | 8/2014 | Zhang | H04B 7/0689 | 375/260 |
| 2014/0294111 A1 * | 10/2014 | Zhang | H04B 7/0417 | 375/267 |
| 2015/0085944 A1 * | 3/2015 | Mobasher | H04B 7/0691 | 375/267 |
| 2015/0214633 A1 * | 7/2015 | Pan | H01Q 1/20 | 342/372 |
| 2015/0229383 A1 * | 8/2015 | Chen | H04B 7/0885 | 370/329 |
| 2015/0237522 A1 * | 8/2015 | Takano | H04B 7/0619 | 370/329 |
| 2015/0281973 A1 * | 10/2015 | Svedman | H04B 7/04 | 455/454 |
| 2015/0312919 A1 * | 10/2015 | Lee | H04B 7/0473 | 370/252 |
| 2016/0007884 A1 * | 1/2016 | Zhu | A61B 5/6831 | 600/384 |
| 2016/0142922 A1 * | 5/2016 | Chen | H04B 7/0695 | 375/267 |
| 2016/0150542 A1 * | 5/2016 | Tarighat Mehrabani | H04W 16/28 | 370/329 |
| 2016/0211898 A1 * | 7/2016 | Cai | H04B 7/0617 | |
| 2016/0352002 A1 * | 12/2016 | Aue | H01Q 1/246 | |
| 2016/0373938 A1 * | 12/2016 | Chen | H04B 7/0695 | |
| 2017/0033847 A1 * | 2/2017 | Lomayev | H04B 7/0413 | |
| 2017/0047968 A1 * | 2/2017 | Moshfeghi | H04B 7/0617 | |
| 2017/0062948 A1 * | 3/2017 | Artemenko | H01Q 3/245 | |
| 2017/0127294 A1 * | 5/2017 | Ui | H04B 7/0695 | |
| 2017/0227623 A1 * | 8/2017 | Park | G01S 3/18 | |
| 2017/0290011 A1 * | 10/2017 | Kushnir | G01S 7/006 | |
| 2017/0331330 A1 * | 11/2017 | Yeo | H02J 50/20 | |
| 2018/0062711 A1 * | 3/2018 | Mizusawa | H04B 7/0452 | |
| 2018/0131102 A1 * | 5/2018 | Wang | H01Q 3/38 | |
| 2018/0205358 A1 * | 7/2018 | Onaka | H03H 7/20 | |
| 2018/0220406 A1 * | 8/2018 | Mizusawa | H04B 7/04 | |
| 2018/0309494 A1 * | 10/2018 | Zhu | H04B 7/0617 | |
| 2018/0316383 A1 * | 11/2018 | Kamgaing | H01Q 21/22 | |
| 2019/0028165 A1 * | 1/2019 | Adachi | H04J 11/00 | |

(56) References Cited

U.S. PATENT DOCUMENTS

| | | | | |
|---|---|---|---|---|
| 2019/0068259 A1* | 2/2019 | Liu | ............... | H01Q 21/06 |
| 2019/0089434 A1* | 3/2019 | Rainish | ............... | H04B 7/0617 |
| 2019/0181894 A1* | 6/2019 | Perumana | ............... | H04B 1/0458 |
| 2019/0334238 A1* | 10/2019 | Honda | ............... | H01Q 3/36 |

FOREIGN PATENT DOCUMENTS

| | | |
|---|---|---|
| CN | 104854800 A | 8/2015 |
| CN | 104981987 A | 10/2015 |

* cited by examiner

WIRELESS COMMUNICATION METHOD AND WIRELESS COMMUNICATION DEVICE

CROSS-REFERENCE TO RELATED APPLICATIONS

The present application is a continuation of U.S. application Ser. No. 15/769,510, filed Apr. 19, 2018, which is based on PCT filing PCT/CN2016/092029, filed Jul. 28, 2016, which claims priority to CN 201510746842.6, filed Nov. 5, 2015, the entire contents of each are incorporated herein by reference.

FIELD

The present disclosure relates to a wireless communication method and a wireless communication device, and in particular to a wireless communication method and a wireless communication device capable of assigning antenna resources flexibly.

BACKGROUND

In recent years, a large amount of available spectrums in millimeter-wave frequency band has drawn much attention in meeting the rapidly increasing demand for mobile communications. Channel characteristics in millimeter-wave frequency band are not very suitable for mobile communications due to great path fading, but massive multi-input multi-output technology may effectively compensate for path fading in the millimeter-wave band.

In consideration of the number and the size of antennas and the antenna spacing, for a base station operating in a frequency band from 1 GHz to 4 GHz, the base station will become bloated when it is equipped with a large number of antennas. The size of the base station may be greatly reduced with the usage of millimeter-wave frequency band. For example, since the size of the antenna is proportional to the wavelength of radio wave, the size of an antenna for 60 GHz frequency band is only 1/30 of the size of an antenna for 2 GHz frequency band. The antenna spacing has the similar characteristics. Therefore, a combination of the massive antenna technology and the millimeter-wave communication makes a base station equipped with a large number of antennas possible.

With respect to the base station equipped with a large number of antennas, in a conventional full-digital precoding architecture, baseband data streams for K users are mapped to M radio frequency (RF) chains and antennas through a baseband full-digital precoding matrix, so as to achieve the best precoding performance. However, this structure requires M radio frequency chains, resulting in large demand for millimeter-wave devices and high power consumption.

In order to achieve a trade-off between performance and power consumption, a hybrid precoding architecture is proposed, in which L (where K|L<<M) radio frequency chains are used to connect baseband data streams to antennas via phase shifters. For example, a hybrid precoding architecture with fixed sub-connections is provided in patent application publication No. WO2013119039A1, in which a specific portion of an antenna array is used for signal transmission for a specific radio frequency chain. However, different radio frequency chains cannot share the antennas with each other, which results in poor flexibility in configurations of the radio frequency chains and the antennas.

SUMMARY

In order to solve the above problem, a more flexible antenna configuration scheme is provided in the present disclosure, in which a flexible connection structure between the radio frequency chains and the antennas is defined. In addition, in the present disclosure, the connections between the antennas and phase shifters can further be configured, thereby realizing a more flexible assignment of antenna resource.

According to an aspect of the present disclosure, a device at a transmitting side in a communication system is provided. The device includes one or more processors configured to: generate multiple data streams to be transmitted to one or more receivers via a first number of radio frequency chains; and configure antenna control parameters for assigning a second number of antennas to the first number of radio frequency chains, wherein the one or more processors dynamically configure the antenna control parameters for a transmission to be performed, and any one of the second number of antennas is assigned to any one of the first number of radio frequency chains in a configurable manner.

According to another aspect of the present disclosure, a device at a receiving side in a communications network is provided. The device includes one or more processors configured to receive and demodulate data signals transmitted via at least two of a first number of radio frequency chains of a transmitter, wherein the at least two of the radio frequency chains are dynamically assigned with different numbers of antennas based on antenna control parameters to perform transmission, and any one of the antennas is assigned to any one of the first number of radio frequency chains in a configurable manner.

According to another aspect of the present disclosure, a method for transmitting downlink signals in a communication system is provided. The method includes: generating multiple data streams to be transmitted to one or more receivers via a first number of radio frequency chains; and configuring antenna control parameters for assigning a second number of antennas to the first number of radio frequency chains, wherein the antenna control parameters are dynamically configured for a transmission to be performed, and any one of the second number of antennas is assigned to any one of the first number of radio frequency chains in a configurable manner.

According to another aspect of the present disclosure, a device at a base station side in a communication system is provided. The device includes one or more processors configured to: generate multiple data streams to be transmitted via multiple antennas; configure antenna control parameters based on a target performance parameter; and assign dynamically, based on the antenna control parameters, one or more antennas for each of the data streams to perform transmission, wherein any one of the multiple antennas is assigned to any one of the multiple data streams in a configurable manner.

BRIEF DESCRIPTION OF THE DRAWINGS

The present disclosure may be better understood with reference to the following description given in connection with the drawings, in which same or like reference numerals are used to denote the same or like components throughout the drawings. The drawings, together with the detailed description below, are incorporated in the specification and form a part of the specification, and are used to further illustrate preferred embodiments of the present disclosure and explain principles and advantages of the present disclosure. In the drawings.

DETAILED DESCRIPTION OF EMBODIMENTS

Figure 1:
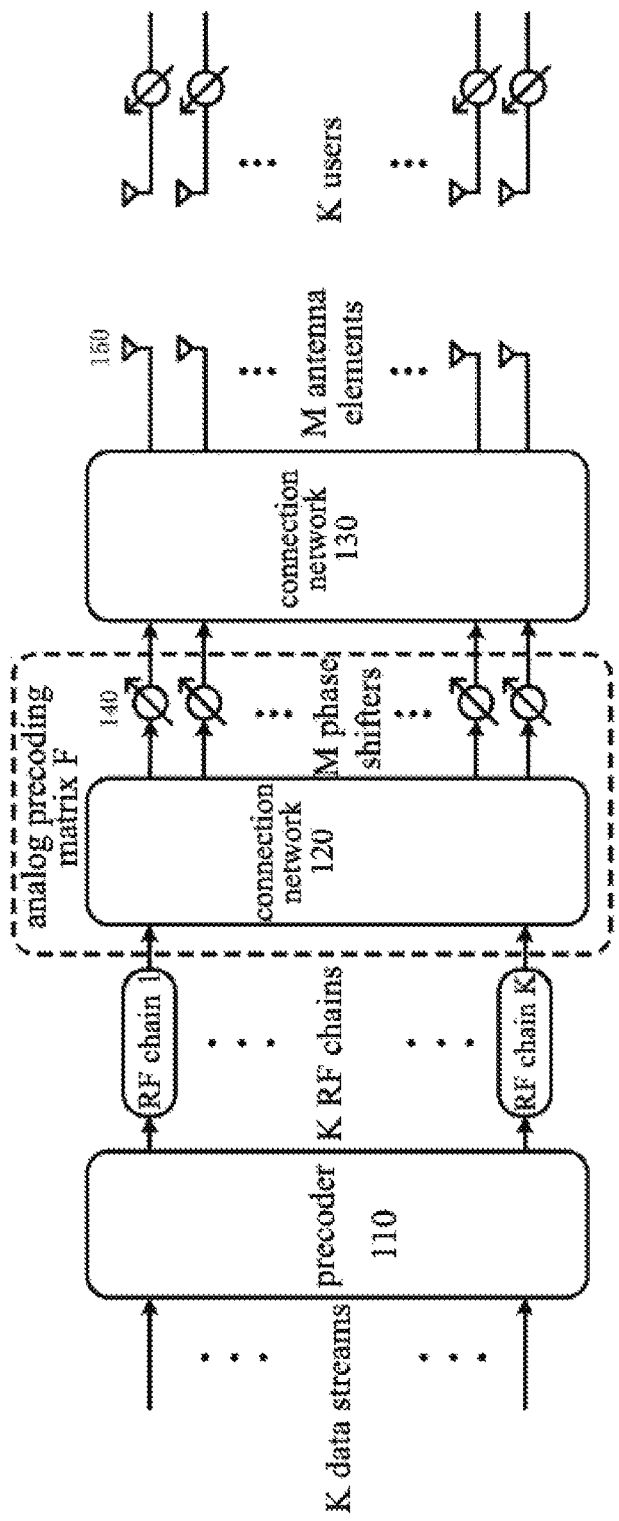
FIG. 1 is a block diagram schematically showing a device at a transmitting side according to a first embodiment of the present disclosure.

FIG. 1 is a block diagram showing a structure of a device at a transmitting side according to a first embodiment of the present disclosure. It should be noted that, although the device at the transmitting side is mainly described below as a device at a base station side, the device at the transmitting side may also be a device at a mobile terminal side. For example, the present disclosure is also applicable to a case where an antenna array and multiple radio frequency chains are provided at the mobile terminal side and signal transmission is performed with the MIMO technology. Therefore, processing performed by a base station hereinafter may also be performed by a mobile terminal having multiple transmitting antennas.

As shown in FIG. 1, K baseband data streams are input into a precoder 110. The precoder 110 precodes the baseband data streams by using a digital precoding matrix W. K precoded data streams are respectively provided to K radio frequency chains for transmission. In some examples of the present disclosure, a data stream may also be regarded as a data layer formed after code words are layer-mapped. The precoder 110 performs digital precoding to suppress mutual interference among K data streams in the transmission over an air interface. The radio frequency chains are used to up-convert, amplify and filter baseband signals to generate radio frequency signals. It should be noted that after the digital precoding is performed, only the data signal corresponding to one data stream may be carried on one radio frequency chain, for example, in a case where the digital precoding matrix W is generated by using decomposition algorithm. In addition, a composite data signal obtained by weighting multiple data streams may also be carried on one radio frequency chain.

The K radio frequency chains are connected to M phase shifters 140 via a connection network 120, where M≥K. A connection between the radio frequency chains and the phase shifters 140 may be dynamically configured by configuring the connection network 120. One radio frequency chain may be connected to one or more phase shifters 140, and one phase shifter 140 may be connected to only one radio frequency chain. In particular, at least two of the K radio frequency chains may be connected to different numbers of the phase shifters 140.

Next, the M phase shifters 140 are connected to M antennas 150 via a connection network 130. The number of the phase shifters 140 is the same as the number of the antennas 150, and the M phase shifters 140 are connected to the M antennas 150 in a one-to-one manner. The connection between the phase shifters 140 and the antennas 150 may be dynamically configured by configuring the connection network 130. For example, antenna 150 connected to each phase shifter 140 may be determined based on the connection network 130.

In this way, the baseband data streams for K users are converted into output signals of the K radio frequency chains. Then the output signals of the K radio frequency chains are transmitted to the K users at the receiving side via the M antennas based on configurations of the connection networks 120 and 130. The connection networks 120 and 130 allow any one of the M antennas to be connected to any one of the K radio frequency chains in a configurable manner. The connection network 120 is controlled by an analog precoding matrix F to determine the connection between the radio frequency chains and the phase shifters. An analog precoding process is performed by using the analog precoding matrix F to improve the reception quality for the users.

The connection networks 120 and 130 may each be implemented with a connection switch controlled by a digital circuitry. Since existing switch circuitry may operate at order of milliseconds, performance requirements for antenna assignment in the present disclosure can be met. Therefore, the connection networks 120 and 130 may be implemented with appropriate known devices by those skilled in the art, which is not described in detail herein.

With the above method, downlink data signals received by the K users may be expressed as follows:

$$y = \frac{1}{\sqrt{\eta}} H'FWs + n \quad (1)$$

where $y=[y_1 y_2 \ldots y_K]^T$, and $y_k$ represents downlink data signal received by the k-th user.

In addition, $$H'=\text{swap}(H,c) \quad (2)$$

where $c=[c_1 c_2 \ldots c_M]$, $c_i \in \{1, 2, \ldots, M\}$, $c_i \neq c_j$, $\forall i \neq j$ represents a configuration matrix for the connection network 130, $c_i$ indicates that the $c_i$-th antenna is connected to the i-th phase shifter, and $H \in \mathbb{C}^{K \times M}$ represents a downlink channel matrix from the M antennas to the K users.

It can be seen from the mathematical expression (2) that $H' \in \mathbb{C}^{K \times M}$ is generated from the original downlink channel matrix H and the configuration matrix c for the connection network 130 by a swap function, and represents an equivalent channel matrix at the phase shifter side. Specifically, the i-th column of H' is the $c_i$-th column of H.

In addition, in the mathematical expression (1), $F \in \mathbb{C}^{M \times K}$ represents an analog precoding matrix generated based on the connection network 120 and the phases of the phase shifters 140. Only one non-zero element exists in each row of the analog precoding matrix F, which indicates that each phase shifter may be connected to only one radio frequency chain.

In addition, $F_{i,j} \neq 0$ indicates that the i-th phase shifter is connected to the j-th radio frequency chain, and value of $F_{i,j}$ represents the phase of the i-th phase shifter 140. $F_{i,j}=0$ indicates that the i-th phase shifter is not connected to the j-th radio frequency chain. It is assumed that the phase of the phase shifter 140 has a constant modulus and is quantized, and it is assumed herein that the phase is quantized with B bits. $F_{i,j}$ may be expressed as follows:

$$F_{i,j} = e^{-j\phi}, \phi \in \left\{\frac{2\pi n}{2^B}: n = 0, 1, \ldots, 2^B - 1\right\}.$$

In addition, $W \in C^{K \times K}$ represents a digital precoding matrix generated based on downlink channel state and the analog precoding matrix F.

In addition, $s=[s_1 s_2 \ldots s_K]^T$, where $s_k$ represents the downlink data signal for the k-th user transmitted from the base station. Further, $n \in C^{K \times 1}$ represents noise.

According to the present embodiment, any one or more of the M phase shifters may be connected to any one of the K radio frequency chains via the connection network 120. In addition, the M phase shifters may also be flexibly connected to the M antennas via the connection network 130. In this case, the configuration matrix $c=[c_1 c_2 \ldots c_M]$ for the connection network 130 is required to meet a constraint $c_i \in \{1, 2, \ldots, M\}$, $c_i \neq c_j$, $\forall i \neq j$.

Figure 2:
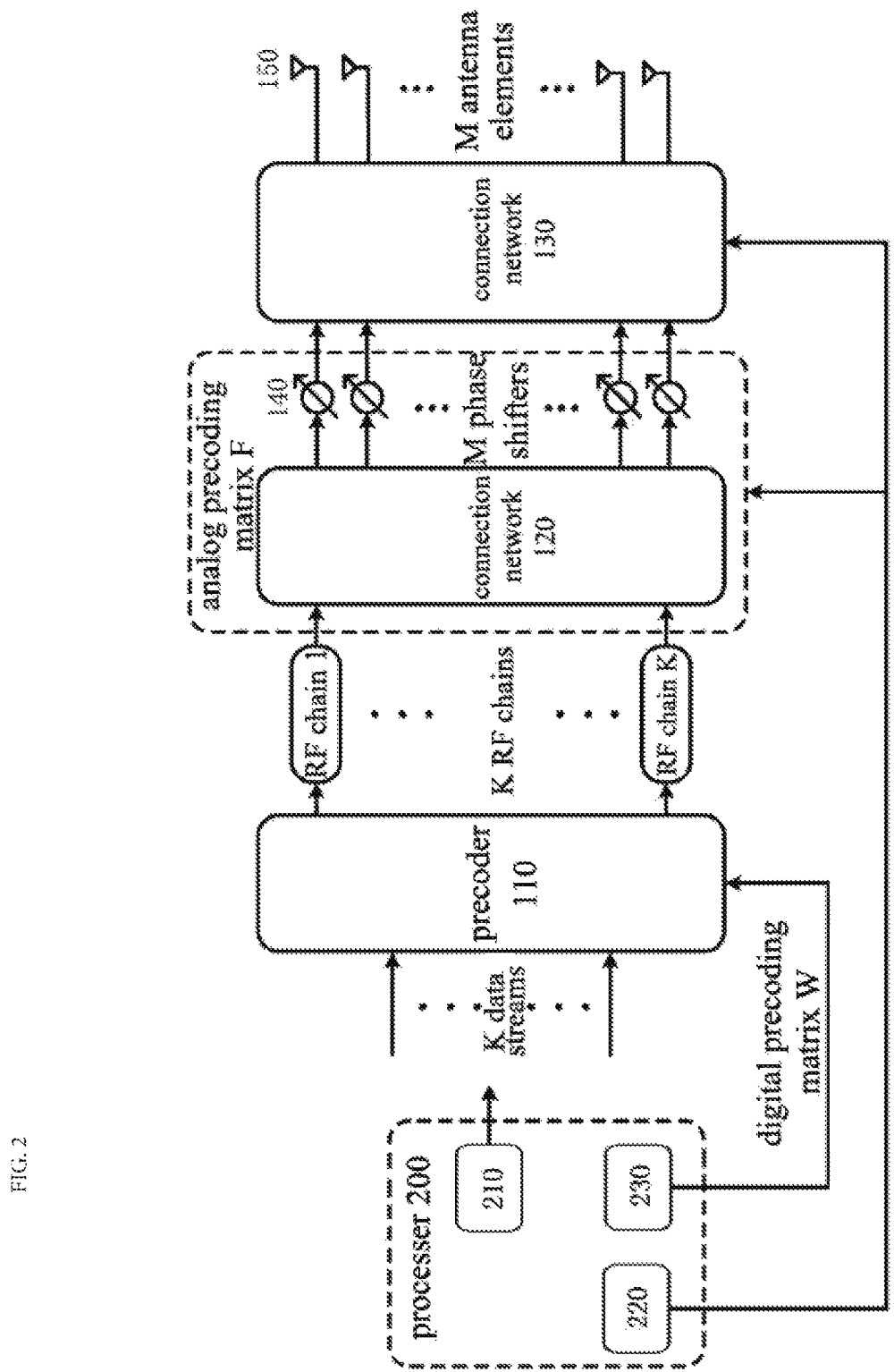
FIG. 2 is a schematic diagram showing a processor in the device at the transmitting side according to the first embodiment.

FIG. 2 is a schematic diagram showing a processor in the device at the transmitting side according to the first embodiment. As shown in FIG. 2, processor 200 includes data stream generation module 210, antenna assignment control module 220 and digital precoding matrix generation module 230. The data stream generation module 210 is configured to generate K baseband data streams. The antenna assignment control module 220 is configured to calculate configuration matrixes of connection networks 120 and 130 as well as phase parameters of phase shifters 140 with an antenna assignment algorithm, and generate control signals based on calculation results to control a dynamic connection between K radio frequency chains and M phase shifters 140 and a dynamic connection between the M phase shifters 140 and M antennas 150 in order to achieve a desired target performance parameter. In the present disclosure, the target performance parameter may be, for example, QoS requirements of the users at the receiving side, or throughput requirement of the system. In addition, the digital precoding matrix generation module 230 is configured to generate digital precoding matrix W based on the calculated phase parameters of the phase shifters 140 and downlink channel states. In this case, precoder 110 is configured to perform digital precoding on the K data streams by using the generated digital precoding matrix W and provide the precoded data streams to the K radio frequency chains. It should be noted that although the precoder 110 is illustrated in FIG. 2 as being external to the processor 200, the precoder 110 may generally be incorporated in the processor 200 to form a part of the processor 200.

Antenna assignment processing performed by the processor 200 is described below with respect to the QoS requirements and the throughput requirement, respectively.

It is assumed that $N_k$ phase shifters (and correspondingly, $N_k$ antennas) are assigned for each radio frequency chain in FIG. 1. In order to meet different QoS requirements of different users, different QoS may be achieved by adjusting assignment of the antenna $\{N_k : 1 \leq k \leq K\}$ on the premise of meeting $$\sum_{k=1}^{K} N_k = M.$$

Specifically, as $N_k$ is greater, a greater number of antennas are assigned to the k-th radio frequency chain, i.e., to the k-th data stream, thereby improving reception quality of the signal for the user at the receiving side corresponding to the k-th data stream and providing a higher QoS for the user.

On the other hand, the throughput of the downlink may be optimized by adjusting assignment of the antenna $\{N_k : 1 \leq k \leq K\}$ on the premise of meeting $$\sum_{k=1}^{K} N_k = M.$$

Specifically, the overall throughput of the base station may be increased by assigning a greater number of antennas to the data streams corresponding to the users with better channel conditions.

It should be noted that in the above two aspects, in addition to assigning a greater number of antennas, the target performance may also be achieved by assigning an antenna with better performance, for example, assigning an antenna with higher gain.

For example, in the present embodiment, the processor 200 of the base station may determine the assignment with regard to the number of antennas based on the QoS requirements of the users, i.e., determining the numbers of the phase shifters and the antennas assigned for each radio frequency chain. It is assumed that phases of phase shifters corresponding to a radio frequency chain do not change over a period of time. In this case, the processor 200 may further assign, based on the QoS requirement of the user, an antenna with good instantaneous channel gain to the phase shifter corresponding to the radio frequency chain of the user, thereby enhancing downlink equivalent channel of the user and increasing strength of the received downlink signal.

Figure 3:
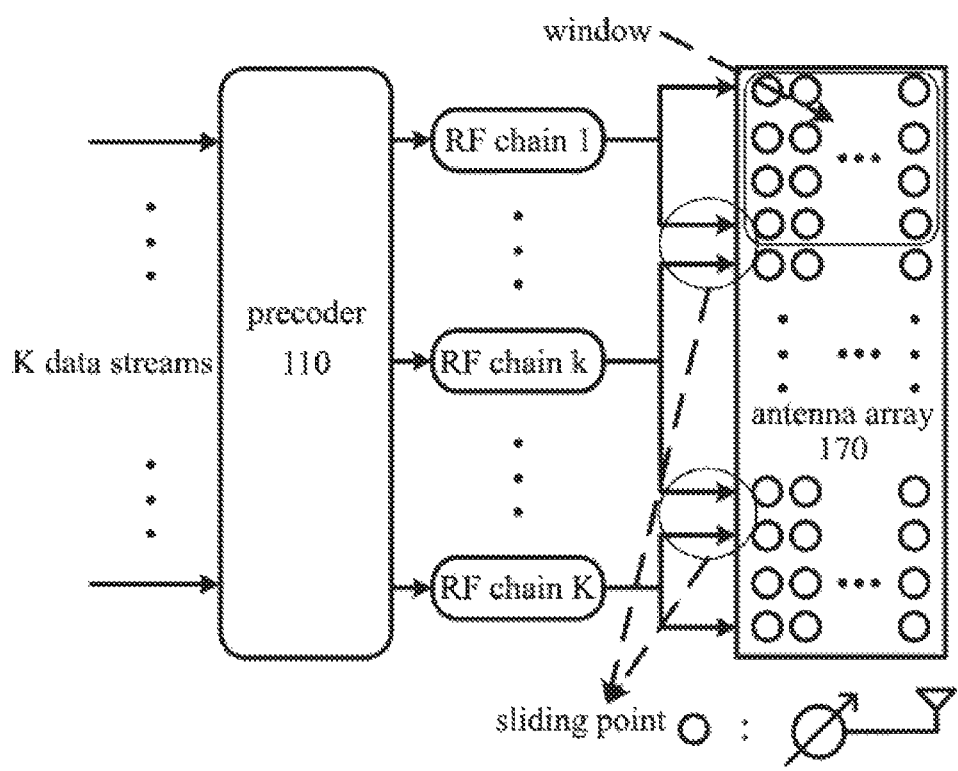
FIG. 3 is a block diagram schematically showing a device at a transmitting side according to a second embodiment of the present disclosure.

FIG. 3 is a structural block diagram showing a device at a transmitting side according to a second embodiment of the present disclosure. The second embodiment is a simplification of the first embodiment. Specifically, in FIG. 3, the connection network 130 is omitted and the connection network 120 is simplified compared with FIG. 1 and FIG. 2. For simplicity, descriptions of the same parts (such as the processor 200, the precoder 110, and the radio frequency chains) in the second embodiment as those in the first embodiment are omitted, and only differences between the second embodiment and the first embodiment are mainly described below.

In FIG. 3, since the connection network 130 between the phase shifters and the antennas shown in FIG. 1 is omitted, one antenna is fixedly connected to one phase shifter in the present embodiment, and a combination of one antenna and one phase shifter is represented by one circle in an antenna array 170. The combination may be referred to as an antenna 150 hereafter.

In addition, as a simplification of the connection network 120 shown in FIG. 1, a "sliding window" scheme is provided according to the present embodiment to assign M antennas to K radio frequency chains. Specifically, the total number M of antennas 150 are ranked, and radio frequency chain 1 is connected to the first $N_1$ antennas 150, and then radio frequency chain 2 is connected to the next $N_2$ antennas 150, and so on, until all K radio frequency chains are each assigned with antennas. As described above, the radio frequency chains are each dynamically assigned with different antennas based on a specific target performance. In the assignment scheme according to the present embodiment, the target performance parameter is mainly achieved by changing the number of the assigned antennas. As visually shown in FIG. 3, antenna resources assigned to each radio frequency chain may be changed by changing the size of antenna window in the antenna array 170 corresponding to each radio frequency chain.

According to the present embodiment, since the connection network 120 is simplified, the analog precoding matrix F may be expressed as follows:

$$F = \begin{bmatrix} f_1 & 0_{N_1} & \cdots & 0_{N_1} \\ 0_{N_2} & f_2 & \cdots & 0_{N_2} \\ \vdots & \vdots & \ddots & \vdots \\ 0_{N_K} & 0_{N_K} & \cdots & f_K \end{bmatrix}, \quad (3)$$

where $0_{N_k}$ represents a zero column vector having a length of $$N_k, f_k = [f_{k,1} f_{k,2} \cdots f_{k,N_k}]^T, f_{k,j} = e^{-j\phi},$$

$$\phi \in \left\{ \frac{2\pi n}{2^B} : n = 0, 1, \ldots, 2^B - 1 \right\}$$

represents phases of $N_k$ phase shifters connected to the k-th radio frequency chain.

The position of a non-zero vector $f_k$ in the matrix F meets a constraint of the sliding window. That is, it is necessary to sequentially select multiple successive antennas 150, where $$\sum_{k=1}^{K} N_k = M$$

represents a constraint on the total number of antennas.

In this embodiment, the processor 200 of the base station may first determine, based on a specific target performance parameter, an assignment scheme with regard to the number of antennas, i.e., $\{N_k: 1 \le k \le K\}$, and then determine positions of non-zero elements in the analog precoding matrix F based on $\{N_k: 1 \le k \le K\}$. Next, with a principle that the downlink equivalent channel is the strongest, i.e., a principle that $\|HF\|_F^2$ is maximized (where H is downlink channel matrix to K users), the processor 200 may determine values of the non-zero elements in the analog precoding matrix F as phase values of the phase shifters. Next, the processor 200 may generate digital precoding matrix W by using, for example, a matched filter (MF) and a zero-forcing criterion (ZF) based on the determined equivalent channel HF, so as to perform digital precoding on the baseband data streams.

In the example of calculating the digital precoding matrix W using the zero-forcing criterion, it is assumed that a composite data signal obtained by weighting multiple data streams is carried on one radio frequency chain. In this case, antenna resources assigned to the radio frequency chain may be more greatly affected by QoS requirements of the users at the receiving side corresponding to the data streams with greater weights in the composite data signal.

The "sliding window" scheme according to the present embodiment can be realized in a simple manner and has low hardware cost, and may be applied to, for example, the following scenarios 1 and 2.

In scenario 1, the number of antennas for transmitting data signals to a user at the receiving side is determined based on QoS requirement of the user. For example, in a case where communication quality for a user is poor and the user requests the base station to improve the service quality, the base station may improve downlink reception signal-to-noise ratio for the user by assigning more antennas for the transmission of the data signals of the user, thereby improving the communication quality.

In scenario 2, the base station assigns more antennas to the user with better communication conditions to improve the throughput of the whole system.

Figure 4:
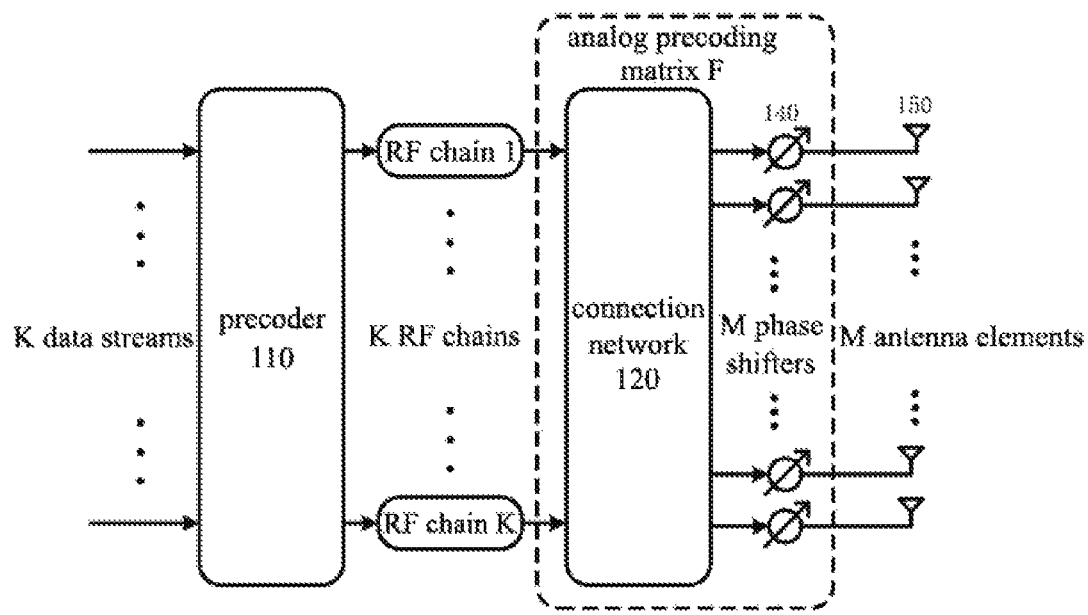
FIG. 4 is a block diagram schematically showing a device at a transmitting side according to a third embodiment of the present disclosure.

FIG. 4 is a structural block diagram showing a device at a transmitting side according to a third embodiment of the present disclosure. In the third embodiment, the structure of the base station is simplified by omitting the connection network 130 compared with the first embodiment shown in FIG. 1 and FIG. 2. For simplicity, descriptions of the same parts (such as the processor 200, the precoder 110, and the radio frequency chains) in the third embodiment as those in the first embodiment are omitted, and only differences between the third embodiment and the first embodiment are described below.

In this embodiment, since the connection network 130 between the phase shifters 140 and the antennas 150 is omitted, it may be regarded that the phase shifters 140 are fixedly connected to the antennas 150 in a one-to-one manner.

As shown in FIG. 4, the connection network 120 between the K radio frequency chains and the M phase shifters 140 is the same as the connection network 120 in FIG. 1, and may be used to globally configure the connections between the radio frequency chains and the phase shifter 140s (as well as the antennas 150). That is, any $N_k$ phase shifters of the M phase shifters may be connected to the k-th radio frequency chain. In this regard, complexity of the connection network 120 is higher than the "sliding window" scheme in the second embodiment.

In this embodiment, the analog precoding matrix F may be expressed as follows:

$$F=[F_{i,j}]_{M\times K},$$

and the analog precoding matrix F meets the following constraint conditions:

Condition 1: $F_{i,j}=0$ or $$F_{i,j} = e^{-j\phi}, \phi \in \left\{\frac{2\pi n}{2^B} : n = 0, 1, \ldots, 2^B - 1\right\};$$

Condition 2: if it is assumed that $N_j$ phase shifters (antennas) are assigned to the j-th radio frequency chain, $\Sigma_{i=1}^{M}|F_{i,j}|=N_j, 1\le j\le K$; and Condition 3: since each phase shifter (antenna) can be connected to only one radio frequency chain, $\Sigma_{j=1}^{K}|F_{i,j}|=1$, $1\le i\le M$.

In this embodiment, the processor 200 of the base station may first determine, based on a target performance, an assignment scheme with regard to the number of antennas, i.e., $\{N_k : 1\le k\le K\}$, and then determine the selection sequence of antennas based on levels of QoSs required by the users, that is, the processor 200 may preferably select antennas with higher gains for the users with higher QoS requirements, so as to determine positions of non-zero elements in the analog precoding matrix F. Next, with a principle that the downlink equivalent channel is the strongest, i.e., a principle that $\|HF\|_F^2$ is maximized, the processer 200 may determine values of the non-zero elements in the analog precoding matrix F as phase values of the phase shifters. Next, the processer 200 may generate digital precoding matrix W based on the determined equivalent channel HF, to perform digital precoding on the baseband data streams.

Compared with the second embodiment, in this embodiment, antennas may be more flexibly assigned in consideration of gains of the antennas, rather than being assigned only in sequence. Therefore, the present embodiment may be applied to the following scenario. Based on QoS requirements of the users at the receiving side, antennas with higher gains may be selected in an antenna array to transmit data signals to the users with higher QoS requirements. In addition, in order to ensure the QoS, the method for controlling the number of antennas in the second embodiment may also be adopted.

In the embodiments of the present disclosure, a user at the receiving side may measure a reference signal such as a channel state information reference signal (CSI-RS) transmitted from the base station and accordingly estimate channel state to obtain channel state information (CSI), and the user may report the channel state information to the base station. The base station may determine gains of antennas based on the channel state information such as channel direction information (CDI) or precoding matrix indication (PMI) reported by the user, thereby assigning the antennas in consideration of gains of the antennas.

Figure 5:
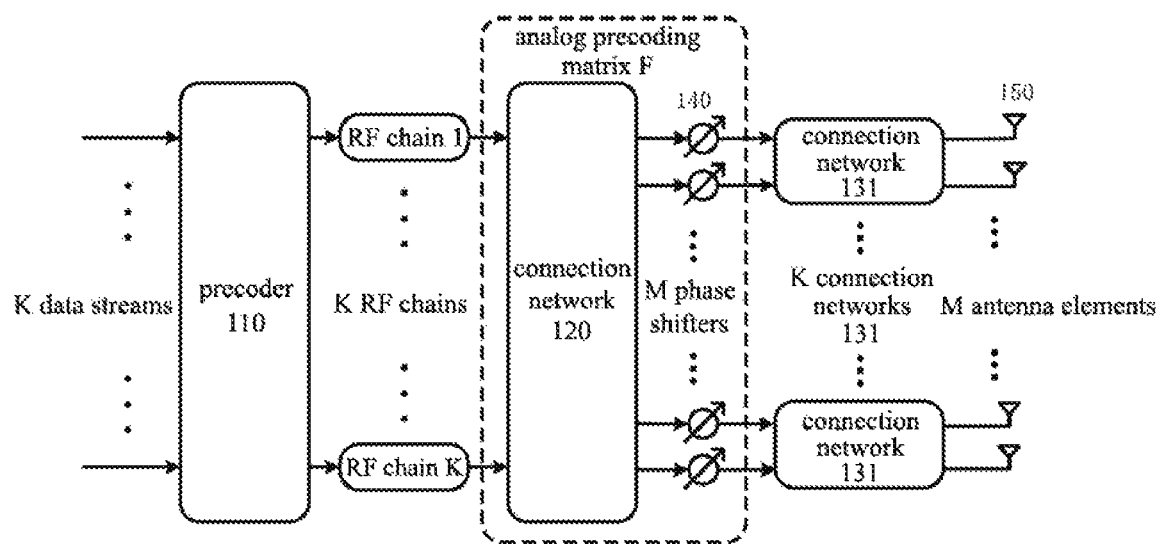
FIG. 5 is a block diagram schematically showing a device at a transmitting side according to a fourth embodiment of the present disclosure.

FIG. 5 is a structural block diagram showing a device at a transmitting side according to a fourth embodiment of the present disclosure. The fourth embodiment differs from the first embodiment shown in FIG. 1 and FIG. 2 in the connection networks 131. For simplicity, descriptions of the same parts (such as the processor 200, the precoder 110, and the connection network 120) in the fourth embodiment as those in the first embodiment are omitted, and only differences between the fourth embodiment and the first embodiment are described below.

The connection network 130 shown in FIG. 1 is used to globally configure the connections between M phase shifters 140 and M antennas 150. That is, any one phase shifter 140 may be connected to any one antenna 150 via the connection network 130.

In contrast, the connection network 131 shown in FIG. 5 is used to locally configure the connections between the phase shifters 140 and the antennas 150. Specifically, the M phase shifters 140 and the M antennas 150 are respectively divided into multiple groups, and each group corresponds to one connection network 131 that only configures the connections between phase shifters 140 and antennas 150 in the group. Therefore, only the phase shifters 140 and the antennas 150 belonging to the same group may be connected with each other, and the phase shifters 140 and the antennas 150 in different groups cannot be connected with each other.

It should be noted that although the connection network 120 in FIG. 1 is adopted as a connection network between radio frequency chains and phase shifters in FIG. 5, the "sliding window" scheme shown in FIG. 3 may be alternatively adopted.

A configuration matrix for the connection network 131 is described below.

The configuration matrix c for the connection network 130 described above is divided into K sub-matrices, i.e., $c=[c_1 c_2 \ldots c_K]$, where $c_k=[c_{k,1} c_{k,2} \ldots c_{k,N_k}]$ represents connections between $N_k$ phase shifters 140 connected to the k-th radio frequency chain and $N_k$ antennas 150 belonging to the same group.

It is assumed that the connection network 120 illustrated in FIG. 4 adopts the "sliding window" scheme. Phase shifters 140 and antennas 150 corresponding to the k-th radio frequency chain are numbered with $$\left[\sum_{i=1}^{k-1} N_i + 1, \sum_{i=1}^{k} N_i\right],$$

and sub-matrix $c_k=[c_{k,1} c_{k,2} \ldots c_{k,N_k}]$ between the phase shifters 140 and the antennas 150 needs to meet the following constraint conditions:

Condition 1: since the phase shifters may be connected to only the antennas in the same group, $$c_{k,i} \in \left[\sum_{i=1}^{k-1} N_i + 1, \sum_{i=1}^{k} N_i\right], 1 \le i \le N_k;$$

and

Condition 2: since the phase shifters are connected to the antennas in a one-to-one manner, $c_{k,i}\ne c_{k,j}, i\ne j, 1\le i, j\le N_k$.

In this embodiment, it is assumed that the processor 200 of the base station has determined the assignment with regard to the number of antennas (i.e., the numbers of the phase shifters and the antennas assigned for each radio frequency chain are determined) based on QoS requirements of the users, and phases of phase shifters corresponding to a radio frequency chain do not change over a period of time. In this case, connection network 131 between the phase shifters and the antennas assigned for the radio frequency chain may be designed with a principle that matching gain between the phase shifters and the antennas (i.e., the phase shifters and the antennas belonging to the same group) is maximized.

Compared with the connection network 130 shown in FIG. 1, the connection network 131 in the present embodiment is used to configure connections between phase shifters and antennas in a relatively small range, thereby reducing calculation complexity and requirement for hardware performance, i.e., reducing the difficulty in realizing the connection network 131.

For example, the present embodiment may be applied to the following scenarios 1 and 2.

In scenario 1, combinations of phase shifters and antennas may be adjusted in each group to improve reception signal-to-noise ratios of the users, in a case where a speed at which phases of the phase shifters can be controlled cannot keep up with a speed at which channel gain changes.

In scenario 2, phase settings of phase shifters may not well match with gains of antennas when the number of codebooks available to the phase shifters is small. In this case, the channel gain may be maximized by adjusting combinations of phase shifters and antennas in each group, thereby improving reception signal-to-noise ratios of the users.

Figure 6:
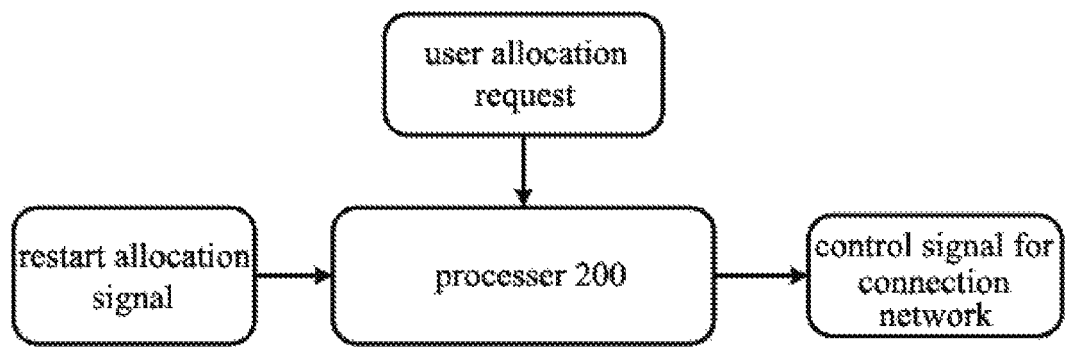
FIG. 6 schematically shows a feedback mechanism according to the present disclosure.

FIG. 6 shows a feedback mechanism according to the present disclosure. As shown in FIG. 6, a resource allocation request or a restart allocation signal from a user at the receiving side may be input to the processor 200, and the processor 200 may dynamically adjust antenna assignment in real time based on these signals.

The restart allocation signal may be generated when the base station is restarted, or resources are reassigned at a preset time interval (for example, to avoid an infinite loop in the local adjustment, etc.). Upon receiving the restart allocation signal, the processor 200 reassigns the antenna resources for each radio frequency chain in the above manner, for example, based on real-time channel state or QoS requirement.

In addition, when communication quality for a specific user at the receiving side degrades and the user requests the base station to improve the antenna resources to improve the communication quality, the user may transmit a resource allocation request to the base station. For example, the resource allocation request may include channel state information (CSI) such as channel quality indicator (CQI) fed back from the user and precoding matrix indicator (PMI). Upon receiving the channel state fed back from the user and the resource allocation request, the processor 200 may, for example, assign a part of the antennas of other users to the user to increase strength of the received downlink signal for the user. Alternatively, in addition to increasing the number of antennas, the base station may also assign antennas with better performance (for example, antenna gain) to the user.

The processor 200 then generates new control signals for connection networks to change configurations of the connection networks 120, 130 and phase parameters of the phase shifter 140, thereby reassigning the antennas.

Figure 7:
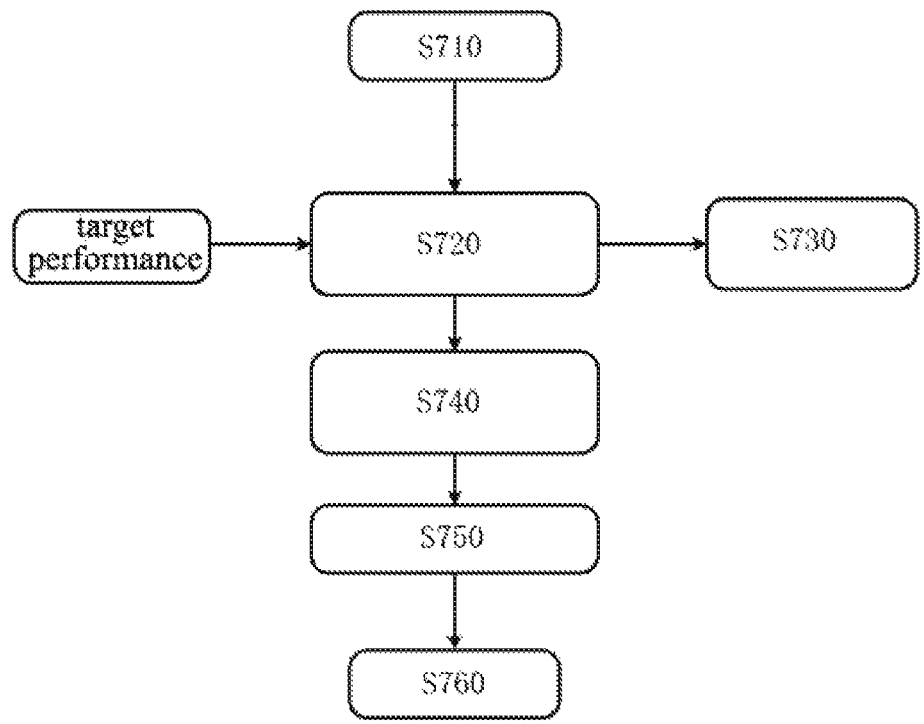
FIG. 7 is a flowchart showing a method for transmitting downlink signals according to the present disclosure.

FIG. 7 is a flowchart showing a method for transmitting downlink signals according to the present disclosure. The process of transmitting downlink signals is described below in detail in connection with the drawing.

First, as shown in step S710, the base station obtains an estimation of uplink channel based on the received uplink pilot. Since uplink and downlink channel characteristics are reciprocal in a time division duplex system, the base station may obtain an estimation of downlink channel based on the obtained estimation of uplink channel.

Then, in step S720, the antenna assignment control module 220 of the processor 200 calculates, using an antenna assignment algorithm, parameters for the connection network 120 between the radio frequency chains and the phase shifters, parameters for the connection network 130 between the phase shifters and the antennas, and phase parameters of the phase shifters, based on the target performance parameter such as QoS requirements of the users or throughput of the system.

In step S730, the antenna assignment control module 220 generates control signals for connection networks based on calculation results to configure the connection networks 120 and 130 and the phase shifters 140, thereby assigning antenna resources.

In addition, in step 740, the digital precoding matrix generation module 230 of the processor 200 calculates analog precoding matrix F and equivalent channel at the radio frequency end based on the calculated parameters of the connection networks 120 and 130 and the phase shifters 140.

Then, in step S750, the digital precoding matrix generation module 230 calculates digital precoding matrix W based on the equivalent channel, and therefore the precoder 110 performs precoding on the baseband data streams by using the generated digital precoding matrix W and provides the precoded data streams to respective radio frequency chains. As described above, the function of the precoder 110 may be integrated into the processor 200.

Finally, in step S760, radio frequency signals for each radio frequency chain is transmitted to the corresponding user by using the antennas assigned in step S730.

The embodiments of the present disclosure have been described above in connection with the drawings. According to the connection network scheme in the present disclosure, a flexible configuration between radio frequency chains and antennas as well as a flexible configuration between phase shifters and the antennas can be realized, while the antenna array can be fully utilized. In addition, according to the present disclosure, a connection network can be dynamically configured in real time based on target performances (such as QoS requirements of the users or throughput of the system), thereby greatly improving the performance of the hybrid precoding architecture.

Various devices or modules are described herein only in the logical sense and do not strictly correspond to any physical devices or entities. For example, the functionality of each module described herein may be implemented by multiple physical entities or the functionalities of multiple modules described herein may be implemented by a single physical entity. In addition, it should be noted that features, components, elements or steps, and the like described in an embodiment are not limited to this embodiment, but may also be applied to other embodiments, for example, by replacing specific features, components, elements, steps and the like in other embodiments or combining with them.

The series of processes executed by each device or module in the above embodiments may be implemented by software, hardware, or a combination of software and hardware. Programs included in the software may be stored in advance in a storage medium provided inside or outside each device. As an example, during execution, these programs are written into random access memory (RAM) and executed by a processor (such as CPU).

The technology of the present disclosure can be applied to various products. For example, a device at the transmitting side in each of the embodiments may be implemented as a main device (base station device) that controls wireless communication at the base station side or a fully-assembled base station. The base station may be implemented as any type of evolved node B (eNB), such as macro eNB and small eNB. The small eNB may be an eNB covering a cell smaller than a macro cell, such as pico eNB, micro eNB and home (femto) eNB. Alternatively, the base station may be implemented as any other type of base stations, such as NodeB and base transceiver station (BTS). The base station may include: a main body (also referred to as a base station device) configured to control wireless communication; and one or more remote radio heads (RRH) located at positions different from the main body. In addition, various types of terminals described below each may operate as a base station by temporarily or semi-persistently performing functions of the base station.

For example, a device at the receiving side operating in cooperation with the device at the transmitting side in each of the embodiments may be implemented as a terminal device, for example, may be implemented as a mobile terminal (such as smart phone, tablet personal computer (PC), notebook PC, portable game terminal, portable/dongle mobile router and digital camera) or an On-Board terminal (such as navigation device for a car). The terminal device may also be implemented as a terminal (that is also referred to as a machine type communication (MTC) terminal) that performs machine-to-machine (M2M) communication. In addition, the terminal device may be a wireless communication module (such as an integrated circuit module including a single die) installed on each of the above terminals.

In addition, the processor in the present disclosure may be implemented as a baseband processor or a combination of a baseband processor and a general-purpose processor, and is specifically implemented as a central processing unit (CPU) or a digital signal processor (DSP), for example.

Figure 8:
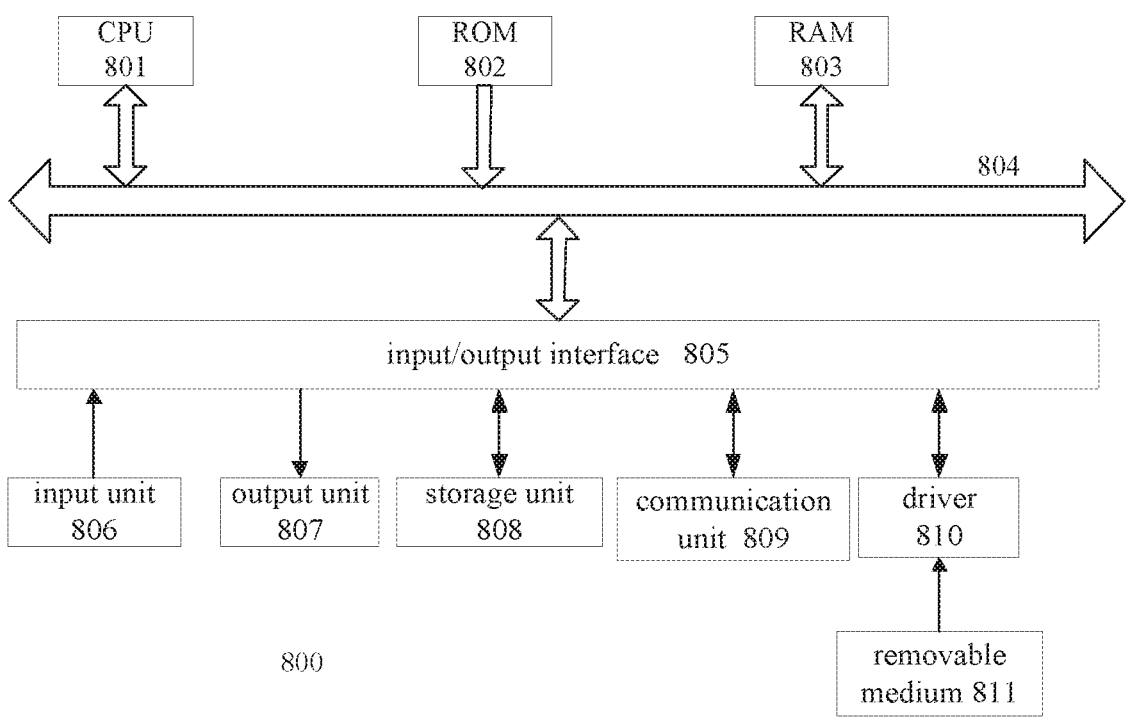
FIG. 8 is a block diagram showing an example configuration of computer hardware.

FIG. 8 is a block diagram showing an example configuration of computer hardware that performs the above-described processing based on a program.

In computer 800, central processing unit (CPU) 801, read only memory (ROM) 802, and random access memory (RAM) 803 are connected to each other via bus 804.

Input/output interface 805 is further connected to the bus 804. The input/output interface 805 is connected with the following components: input unit 806 including keyboard, mouse, microphone and the like; output unit 807 including display, speaker and the like; storage unit 808 including hard disk, nonvolatile memory and the like; communication unit 809 including network interface card (such as local area network (LAN) card, modem); and driver 810 that drives removable medium 811 such as magnetic disk, optical disk, magneto-optical disk or semiconductor memory.

In the computer having the above configuration, the CPU 801 loads a program stored in the storage unit 808 into the RAM 803 via the input/output interface 805 and the bus 804, and executes the program so as to execute the above processing.

The program to be executed by the computer (CPU 801) may be recorded on the removable medium 811 which is a package medium formed by magnetic disk (including floppy disk), optical disk (including compact disk-read only memory (CD-ROM)), digital versatile disk (DVD), and the like), magneto-optical disk, or semiconductor memory, and the like. In addition, the program to be executed by the computer (CPU 801) may also be provided via a wired or wireless transmission medium such as local area network, the Internet, or digital satellite broadcast.

In a case where the removable medium 811 is installed in the driver 810, the program may be installed in the storage unit 808 via the input/output interface 805. In addition, the program may be received by the communication unit 809 via a wired or wireless transmission medium, and then the program may be installed in the storage unit 808. Alternatively, the program may be installed in the ROM 802 or the storage unit 808 in advance.

The program to be executed by the computer may be a program that executes the processes in the order described in the present specification or may be a program that executes the processes in parallel or executes the processes when needed (for example, when called).

The embodiments and the technical effects of the present disclosure have been described above in detail in connection with the drawings, but the scope of the present disclosure is not limited thereto. It should be understood by those skill in the art that various modifications or changes in the embodiments discussed herein can be made without departing from the spirit and principle of the present disclosure, depending on design requirements and other factors. The scope of the present disclosure is defined by the appended claims or their equivalents.

In addition, the present disclosure may also be configured as follows.

A device at a transmitting side in a communication system, including one or more processors configured to: generate multiple data streams to be transmitted to one or more receivers via a first number of radio frequency chains; and configure antenna control parameters for assigning a second number of antennas to the first number of radio frequency chains, wherein the one or more processors dynamically configure the antenna control parameters for a transmission to be performed, and any one of the second number of antennas is assigned to any one of the first number of radio frequency chains in a configurable manner.

The one or more processors may configure the antenna control parameters so that at least two of the first number of radio frequency chains are assigned with different numbers of the antennas.

The one or more processors may configure the antenna control parameters so that the same radio frequency chain is assigned with different antennas in different transmissions.

Each of the radio frequency chains may be assigned with at least one of the antennas, and each of the antennas may be assigned to only one radio frequency chain.

The one or more processors may further be configured to configure the antenna control parameters based on a target performance parameter so that the target performance parameter is achieved by means of antenna assignment based on the antenna control parameters.

The target performance parameter may include at least one of Quality of Service (QoS) parameter of the receiver and throughput of a network.

The device may further include: a radio frequency circuitry connected to the one or more processors and including the first number of radio frequency chains; a second number of phase shifters; and the second number of antennas connected to the radio frequency circuitry via the second number of phase shifters, wherein the radio frequency circuitry transmits, based on the antenna control parameters configured by the one or more processors, data signals to the one or more receivers via the second number of antennas.

The device may further include a switch circuitry operating based on the antenna control parameters, wherein the switch circuitry dynamically connects the first number of radio frequency chains, the second number of phase shifters, and the second number of antennas.

The switch circuitry may include a first switch sub-circuitry and a second switch sub-circuitry, wherein the first switch sub-circuitry dynamically connects the first number of radio frequency chains to the second number of phase shifters, and the second switch sub-circuitry dynamically connects the second number of phase shifters to the second number of antennas.

The antenna control parameters may include a control instruction for the switch circuitry and phase parameters of the phase shifters.

The one or more processors may further be configured to: generate, based on phase parameters of the phase shifters connected to the radio frequency chains and channel states, a precoding matrix for precoding the multiple data streams; and precode the multiple data streams by using the precoding matrix, wherein the precoded data is provided to the first number of radio frequency chains.

The one or more processors may further be configured to reassign the antennas based on feedback information from the receivers.

A device at a receiving side in a communication network, including one or more processors configured to receive and demodulate data signals transmitted via at least two of a first number of radio frequency chains of a transmitter, wherein the at least two of the radio frequency chains are dynamically assigned with different numbers of antennas based on antenna control parameters to perform transmission, and wherein any one of the antennas is assigned to any one of the first number of radio frequency chains in a configurable manner.

The one or more processors may further be configured to provide information indicating reception quality of the data signals to the transmitter so that the transmitter reassigns the antennas based on the information.

A method for transmitting downlink signals in a communication system, including: generating multiple data streams to be transmitted to one or more receivers via a first number of radio frequency chains; and configuring antenna control parameters for assigning a second number of antennas to the first number of radio frequency chains, wherein the antenna control parameters are dynamically configured for a transmission to be performed, and any one of the second number of antennas is assigned to any one of the first number of radio frequency chains in a configurable manner.

The method may further include: connecting dynamically the first number of radio frequency chains to a second number of phase shifters via a first switch circuitry, and connecting dynamically the second number of phase shifters to the second number of antennas via a second switch circuitry, wherein the first switch circuitry and the second switch circuitry operate based on the antenna control parameters.

The method may further include configuring the antenna control parameters based on a target performance parameter so that the target performance parameter is achieved by means of antenna assignment based on the antenna control parameters.

The method may further include: generating, based on phase parameters of the phase shifters connected to the radio frequency chains and channel states, a precoding matrix for precoding the multiple data streams; and precoding the multiple data streams by using the precoding matrix, wherein the precoded data is provided to the first number of radio frequency chains.

A device at a base station side in a communication system, including one or more processors configured to: generate multiple data streams to be transmitted via multiple antennas; configure antenna control parameters based on a target performance parameter; and assign dynamically, based on the antenna control parameters, one or more antennas for each of the data streams to perform transmission, wherein any one of the multiple antennas is assigned to any one of the multiple data streams in a configurable manner.

The target performance parameter may include at least one of Quality of Service (QoS) parameter of a receiver which receives the data stream and throughput of a network.

The invention claimed is:

1. A device at a transmitting side in a communication system, comprising:
   one or more processors;
   radio frequency circuitry connected to the one or more processors and including a first number of radio frequency chains;
   a second number of phase shifters, and a second number of antennas connected to the radio frequency circuitry via the second number of phase shifters,
   wherein the radio frequency circuitry transmits, based on antenna control parameters configured by the one or more processors, data signals to one or more receivers via the second number of antennas;
   switch circuitry operating based on the antenna control parameters, wherein the switch circuitry comprises a first switch sub-circuitry and a second switch sub-circuitry,
   wherein the switch circuitry connects the first number of radio frequency chains, the second number of phase shifters, and the second number of antennas, and
   wherein the first switch sub-circuitry connects the first number of radio frequency chains to the second number of phase shifters, and the second switch sub-circuitry connects the second number of phase shifters to the second number of antennas.

2. The device according to claim 1, wherein the one or more processors configure the antenna control parameters so that at least two of the first number of radio frequency chains are assigned with different numbers of the antennas.

3. The device according to claim 1, wherein the one or more processors configure the antenna control parameters so that a same radio frequency chain is assigned with different antennas in different transmissions.

4. The device according to claim 1, wherein each of the radio frequency chains is assigned with at least one of the antennas, and each of the antennas is assigned to only one radio frequency chain.

5. The device according to claim 1, wherein the one or more processors are further configured to configure the antenna control parameters based on a target performance parameter so that the target performance parameter is achieved by antenna assignment based on the antenna control parameters.

6. The device according to claim 5, wherein the target performance parameter comprises at least one of Quality of Service (QoS) parameter of the receiver and throughput of a network.

7. The device according to claim 1, wherein the antenna control parameters comprise a control instruction for the switch circuitry and phase parameters of the phase shifters.

* * * * *